(12) United States Patent
Chamberot et al.

(10) Patent No.: US 10,853,476 B2
(45) Date of Patent: Dec. 1, 2020

(54) METHOD FOR THE SECURITY OF AN ELECTRONIC OPERATION

(71) Applicant: IDEMIA France, Colombes (FR)

(72) Inventors: Francis Chamberot, Colombes (FR); Marco De Oliveira, Colombes (FR)

(73) Assignee: IDEMIA France, Colombes (FR)

( * ) Notice: Subject to any disclaimer, the term of this patent is extended or adjusted under 35 U.S.C. 154(b) by 309 days.

(21) Appl. No.: 15/886,567

(22) Filed: Feb. 1, 2018

(65) Prior Publication Data

US 2018/0218147 A1 Aug. 2, 2018

(30) Foreign Application Priority Data

Feb. 2, 2017 (FR) ...................................... 17 50876

(51) Int. Cl.
*G06F 21/45* (2013.01)
*G06Q 20/34* (2012.01)
*G06Q 20/40* (2012.01)
*G06F 21/77* (2013.01)

(52) U.S. Cl.
CPC .............. *G06F 21/45* (2013.01); *G06F 21/77* (2013.01); *G06Q 20/341* (2013.01); *G06Q 20/3574* (2013.01); *G06Q 20/40* (2013.01); *G06Q 20/409* (2013.01); *G06F 2221/2137* (2013.01)

(58) Field of Classification Search
CPC .. G06F 21/45; G06F 21/77; G06F 2221/2137; G06F 2221/341; G06F 2221/3574; G06F 2221/40; G06F 2221/409
USPC ........................................................ 726/19
See application file for complete search history.

(56) References Cited

U.S. PATENT DOCUMENTS

| 8,719,952 B1* | 5/2014 | Damm-Goossens ........................ H04L 9/0825 380/285 |
| 2002/0178360 A1* | 11/2002 | Wenocur .............. G06Q 10/107 713/170 |
| 2003/0087601 A1* | 5/2003 | Agam ..................... G06F 21/34 455/39 |
| 2003/0236996 A1* | 12/2003 | Himmel .............. G06F 21/6218 726/30 |
| 2004/0025033 A1* | 2/2004 | Todd ..................... G06F 21/123 713/189 |

(Continued)

FOREIGN PATENT DOCUMENTS

WO 2016/097650 A1 6/2016

OTHER PUBLICATIONS

NPL Search Results (Year: 2020).*

(Continued)

*Primary Examiner* — Syed A Zaidi
(74) *Attorney, Agent, or Firm* — Christensen O'Connor Johnson Kindness PLLC (57) ABSTRACT

A method for assisting in improving the security of an electronic operation carried out via a secure element. The method comprises the following steps. A first application of the secure element is selected and writes a piece of contextual data in means of recording of the secure element. Then, a second application is selected, reads the contextual data in the means for recording and verifies if the contextual data satisfies a predefined condition. If yes, it is considered that the context of the selecting of the second application is legitimate and the electronic operation can continue normally.

17 Claims, 2 Drawing Sheets

(56) References Cited

U.S. PATENT DOCUMENTS

| | | | | |
|---|---|---|---|---|
| 2004/0049463 | A1* | 3/2004 | Kwon | G07F 7/1008 705/50 |
| 2004/0162932 | A1* | 8/2004 | Mizushima | G06F 12/1458 711/103 |
| 2006/0190996 | A1* | 8/2006 | Korkishko | G06F 21/57 726/9 |
| 2007/0011099 | A1* | 1/2007 | Sheehan | G06Q 20/32 705/65 |
| 2008/0034216 | A1* | 2/2008 | Law | H04L 9/3273 713/183 |
| 2008/0121687 | A1* | 5/2008 | Buhot | G06Q 20/32 235/375 |
| 2008/0238709 | A1* | 10/2008 | Vaziri | H04N 5/4403 340/4.32 |
| 2009/0013190 | A1* | 1/2009 | Benhammou | G06F 12/1458 713/185 |
| 2009/0228966 | A1* | 9/2009 | Parfene | H04W 12/06 726/7 |
| 2011/0185407 | A1* | 7/2011 | Perrot | H04L 63/08 726/6 |
| 2011/0321145 | A1* | 12/2011 | Shimotono | G06F 21/31 726/7 |
| 2012/0266220 | A1* | 10/2012 | Brudnicki | G06F 21/34 726/6 |
| 2013/0262317 | A1* | 10/2013 | Collinge | H04W 12/06 705/71 |
| 2014/0368601 | A1* | 12/2014 | deCharms | H04W 4/021 348/14.02 |
| 2015/0227730 | A1* | 8/2015 | Grigg | G06F 21/31 726/7 |
| 2016/0042163 | A1* | 2/2016 | Zhai | G06F 21/316 726/3 |
| 2017/0041296 | A1* | 2/2017 | Ford | H04W 12/06 |
| 2017/0155629 | A1* | 6/2017 | Gomi | H04L 63/062 |

OTHER PUBLICATIONS

Rapport de Recherche Preliminaire, dated Oct. 10, 2017, issued in corresponding French Application No. 1750876, filed Feb. 2, 2017, 2 pages.

Menezes, A.J., et al., "Handbook of Applied Cryptography," CRC Press LLC, USA, Jan. 1, 1997, <math.fau.edu/bkhadka/Syllabi/A%20handbook%20of%20applied%20cryptography.pdf> [retrieved Jan. 31, 2018], 794 pages.

* cited by examiner

METHOD FOR THE SECURITY OF AN ELECTRONIC OPERATION

TECHNICAL FIELD

According to a first aspect, embodiments of this disclosure relate to a method for assisting in improving the security of an electronic operation. According to a second aspect, embodiments of this disclosure relate to a secure element comprising means of computer execution in order to implement the method. According to a third aspect, embodiments of this disclosure propose a computer program comprising instructions for the execution of the steps of the method. According to a fourth aspect, embodiments of this disclosure propose a recording medium that can be read by means of computer execution and whereon are recorded instructions for the execution of the steps of the method.

BACKGROUND

It is known to use a secure element, for example a chip card, in order to carry out an authentication during an electronic operation. For example, such a secure element can be used to authenticate itself with a security door so that it opens automatically, to sign a document electronically by identification or to authenticate itself so that a bank transaction is performed.

A problem is that it is possible for a fraudster to use the secure element without the knowledge of its legitimate user to perform electronic operations that are not desired by the latter. In public transport for example, a fraudster can bring a contactless card reader close to a secure element and have it carry out electronic payment operations without the legitimate user noticing this. It is also possible that a fraudulent electronic payment operation takes advantage of the fact that a user signs a document electronically thanks to his secure element.

It is therefore important to improve the security of the electronic operations carried out with a secure element.

Document WO2016/097650 discloses examples of actions in order to improve the security of electronic operations.

SUMMARY

The purpose of the embodiments of this disclosure is to improve the security of an electronic operation carried out using a secure element due to the taking into account of a piece of information concerning the context wherein the electronic operation is unfolding.

To this effect, according to a first aspect, the embodiments of this disclosure propose a method for assisting in improving the security of an electronic operation, the method being implemented by a secure element comprising means for recording that stores instructions for the execution of a first application and of a second application that is different from the first application, with the method comprising the following successive steps:

(a) a first selecting of the first application;
(b) a writing, by the first application, of a first piece of data in the means for recording;
(c) a selecting of the second application;
(d) a reading, by the second application, of the first piece of data in the means for recording;
(e) a verifying, by the second application, that the first piece of data satisfies a predefined condition; and
(f) if the first piece of data satisfies the predefined condition, a carrying out, by the second application, of the electronic operation which comprises the generating of authentication data from a key stored in the means for recording.

In the method according to the embodiments of this disclosure, the first piece of data supplies the second application with information coming from the first application, i.e. information concerning a previous use of the secure element. This makes it possible to provide the second application with information on the context in which it is selected. Then, by the verification of the predefined condition, the second application judges, according to this contextual information, the legitimacy of the electronic operation that it is supposed to execute. The electronic operation takes place if the legitimacy of the electronic operation is judged to be sufficient based on this contextual information, i.e. based on the first piece of data. The first application and the second application are applications that are different from one another.

The first piece of data can also be called "context information", "contextual information" or "context data".

The method according to the embodiments of this disclosure can be used to improve the security of any electronic operation which comprises the generating of authentication data from a key. This can for example be used for an electronic operation concerning the opening of a security door or a bank payment.

In some embodiments, the secure element is an electronic device capable of running applications and storing encrypted confidential data in a secure way.

The secure element in some embodiments comprises means of computer execution. The secure element is preferably compliant with standard ISO7816 or ISO14443. Preferably, the secure element has passed an EMV security certification.

The secure element can, for example, operate in particular according to the EMV protocol (Europay Mastercard Visa) which is an international standard protocol for the security of payment cards. The EMV protocol makes it possible to reduce the risks of fraud by in particular making possible the authentication of the secure element and of its bearer. The secure element is preferably designed to communicate with an external electronic device called a terminal or reader. The secure element is preferably a portable electronic device or comprised within a portable electronic device. For example, the secure element can be welded to a printed circuit board of a portable electronic device.

In some embodiments, the secure element can be, or be included within, a chip card, also called a microcircuit card. The chip card is preferably compliant with standard ISO7816.

In some embodiments, the secure element can be, or be included within, a portable electronic device of the telephone, smartphone or tablet type. In an embodiment, a portable electronic device that includes the secure element also comprises techniques and methodologies, including suitable circuitry, for implementing near field communication technology.

In the framework of this disclosure, an "electronic operation", which can also be called an "electronic transaction", comprises a plurality of steps implemented by the secure element and potentially one or several other electronic devices. One of these steps is a generating of authentication data from a key stored in means of recording of the secure element, such as memory. The authentication data preferably comprises a securing cryptogram.

In some embodiments, selecting the second application implies the closing of the first application. Indeed, in general, a secure element does not have the resources required to run two applications at the same time. The selecting of an application can, for example, be done via a select command according to the APDU protocol.

In the framework of this disclosure, a piece of data is a piece of digital data and a piece of information is a piece of digital information.

In an embodiment, the second application comprises a read instruction pointing to the first piece of data in the means for recording (e.g., memory).

In some embodiments, the applications are independent of one another and the method according to the embodiments of this disclosure is the sole link between them.

In some embodiments, the first piece of data comprises a piece of time information.

In an embodiment, the first piece of data comprises a means of identifying the first application. In some embodiments, the means for identifying the first application includes data indicative of, representative of, associated with, etc., the first application.

In an embodiment, a plurality of data is written by the first application during the step (b) and read by the second application during the step (d). The verification of the step (e) can cover one or several pieces of data of this plurality. This makes it possible, for example, that a first piece of data of this plurality to be a piece of time information and a second piece of data of this plurality to be a piece of data making it possible to identify the first application.

The generating of the authentication data in some embodiments includes that the secure element determine, based on a key stored in its means of recording (e.g., memory) and potentially on a random piece of data, authentication data. This determination can require the key entry of a secret code sometimes called a PIN code. In an embodiment, once the authentication data has been generated, the secure element sends it to a second electronic device, for example, to a verification entity.

In an embodiment, the authentication data is verified by the verification entity and if the verification of the authentication data is successful, the rest of the electronic operation continues normally. For example, if the electronic operation relates to a payment the latter can take place normally.

In an embodiment, the authentication data is an electronic signature.

In the framework of this disclosure, an "application" is a piece of software or computer executable instructions operating on a secure element.

The means of recording are secure in some embodiments. The means of recording can include several memories. In particular, the means for recording can comprise a first memory and a second memory. The first memory in some embodiments is a non-volatile memory, which may or may not be rewritable. The first memory can be of the ROM or flash type. The first memory in some embodiments comprises at least one portion of the instructions pertaining to the first and to the second applications. The second memory in some embodiments is a non-volatile rewritable memory. For example, the second memory can be of the EEPROM or flash type. The first piece of data in some embodiments is written in the second memory.

In an embodiment, if the first piece of data does not satisfy the predefined condition, the secure element takes a countermeasure. The countermeasure can be, for example, that the secure element sends to a second electronic device a piece of security information that depends on the first piece of data. The countermeasure can be, for example, that the electronic operation has to be carried out online. The countermeasure can be, for example, that the electronic operation is refused, which prevents the following steps of the electronic operation. The countermeasure can be, for example, that the second application is blocked. In this case, only a specific command can unlock the application. The countermeasure can be, for example, that any contactless electronic operation with the secure element becomes prohibited, only electronic operations with contact remain authorised. The countermeasure can be, for example, to reversibly or irreversibly block the secure element. The countermeasure can be, for example, to erase the contents of at least a portion of the means of recording of the secure element. The countermeasure can for example include that the secure element send a piece of security information to a verification entity that, in return, prevents the electronic operation from being executed offline.

According to an embodiment, the predefined condition is a time condition.

A legitimate selecting of the second application can be unlikely immediately after the selecting of the first application. For example, it is unlikely to want to carry out a payment immediately after passing through an entry gate. This embodiment is particularly interesting when the first piece of data comprises a piece of time information.

According to an embodiment, the predefined condition is that the time interval between the first selecting of the first application and the selecting of the second application be longer than a predetermined duration.

An example is as follows. The first piece of data is the time (for example second, minute, hour and day) of the first selecting of the first application. The predefined condition is that the difference between the first piece of data and the temps of the selecting the second application is above a certain threshold.

According to an embodiment, the first selecting of the first application is linked to an electronic operation that corresponds to an entry into an entity, and the predefined condition is that the first selecting of the first application was followed over time by a second selecting of the first application which is linked to an electronic operation that corresponds to an exit from the entity.

The entity can be, for example, a space such as a public transport network, a building or a set of buildings. Preferably, the entry is then a physical entry of the user of the secure element into this space and the exit is then a physical exit of the user from this space. The space is preferably geographically delimited.

The entity can be, for example, a computer entity such as a piece of software or an internet site. Preferably, the entry is then a log in to a session on this computer entity and the exit is a log out from the session.

The first piece of data can be, for example, a piece of binary data that is set to 1 at each entry into the entity and to 0 at each exit from the entity. The predefined condition is then satisfied if the first piece of data is equal to 0 as this means that the entry was followed by an exit.

It is also possible that the first piece of data is the difference between the time of the last exit and the time of the last entry. The predefined condition is then satisfied if this difference is positive and is not satisfied if this difference is negative or is undetermined.

This makes it possible for example to prevent any electronic payment operation in a public transport network.

According to an embodiment, if, during the step (e), the first piece of data does not satisfy the predefined condition, the second application determines a piece of security information and sends it to a second electronic device.

The second electronic device is an electronic device outside of or discrete from the chip card. This is, for example, a reader of the secure element or a verification entity that can verify the authentication data. The determination of the security information can be, for example, carried out in the framework of the EMV protocol during a step of Card Risk Management.

According to an embodiment, selecting the second application is carried out by a contactless communication technology, for example a near field communication technology.

Contactless communication technologies are particularly subjected to fraud wherein the secure element is used without the knowledge of its legitimate user. It is therefore particularly interesting to use the method according to the embodiments of this disclosure to secure contactless electronic operations. An example of such a technology is the Near Field Communication (NFC) technology.

According to an embodiment, if, during the step (e), the first piece of data does not satisfy the predefined condition, the second application forces the electronic operation to be carried out via a communication technology with contact.

This makes it possible to ensure that the legitimate user of the secure element is aware of the electronic operation.

According to an embodiment, a first memory space of the means for recording corresponds to the first application, a second memory space of the means for recording, different from the first memory space, corresponds to the second application, and when the second application reads the first piece of data during the step (d), it reads it in the first memory space.

This allows the first application to be a standard application that does not have to be modified in order to implement the method according to the embodiments of this disclosure.

In the framework of this disclosure, a "memory space" can comprise a plurality of files, in particular a plurality of files of the same directory file.

According to an embodiment, the first memory space is a directory file of the first application and the second memory space is a directory file of the second application.

This corresponds to an application architecture of the "ISO 7816-4 file system" type which is an application architecture that is often used in chip cards.

According to an embodiment, the first application is a first applet, the second application is a second applet, the first memory space is dedicated to the first applet and the second memory space is dedicated to the second applet.

This corresponds to an application architecture of the JAVA platform type which is another application architecture that is often used in chip cards.

According to an embodiment, the first application is an application for access to a public transport network.

Indeed, chip card fraud is common in public transport. The method according to the embodiments of this disclosure can for example be implemented on a secure element that has a first application for access to public transport and a second application for electronic payments.

In the framework of this disclosure, an "access to a public transport network" comprises in some embodiments a clocking-in in the network. It can also include, but not necessarily, the opening of a door of the network.

According to an embodiment, the step (b) is triggered by clocking-in in the public transport network.

In some embodiments, the steps (a) and the steps (b) are triggered by a clocking-in in the public transport network.

The clocking-in can include, for example, a validation of a software ticket present on the secure element.

According to an embodiment, the clocking-in results in an opening of an entry gate.

According to an embodiment, the first application is an identification application.

An identification application makes it possible to identify someone based on his secure element. This identification application makes it possible in general to sign documents electronically. This can for example be done with an electronic identity card such as the one used in Belgium, a citizen card or an electronic passport.

According to an embodiment, the second application is an electronic payment application.

According to an embodiment, the generating of authentication data comprises a determination of a payment cryptogram.

In some embodiments, the authentication data then forms the payment cryptogram. The payment cryptogram is a securing cryptogram used for an electronic payment operation.

According to an embodiment, the secure element is included in a chip card or a mobile telephone.

According to a second aspect, the embodiments of this disclosure propose a secure element comprising means of computer execution in order to implement the method according to one of the embodiments of the disclosure. The embodiments of this disclosure also relate to any electronic device comprising the secure element.

These means of computer execution can include, for example, a microprocessor of the secure element.

According to a third aspect, the embodiments of this disclosure propose a computer program comprising instructions for the execution of the steps of the method according to one of the embodiments when the computer program is executed by a secure element.

According to a fourth aspect, the embodiments of this disclosure propose a recording medium that can be read by means of computer execution and whereon are recorded instructions for the execution of the steps of the method according to one of the embodiments of the disclosure. This recording medium can include or at least be partially comprised in the means for recording of the secure element.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The embodiments of this disclosure are described with particular embodiments and references to figures but the embodiments of this disclosure are not limited by the latter. The drawings or figures described are only diagrammatical and are not limiting. In the FIGURES, identical or similar elements can bear the same references.

In the context of this document, the terms "first", "second" or "last" are used solely to differentiate the various elements and do not imply any order between these elements.

Figure 1:
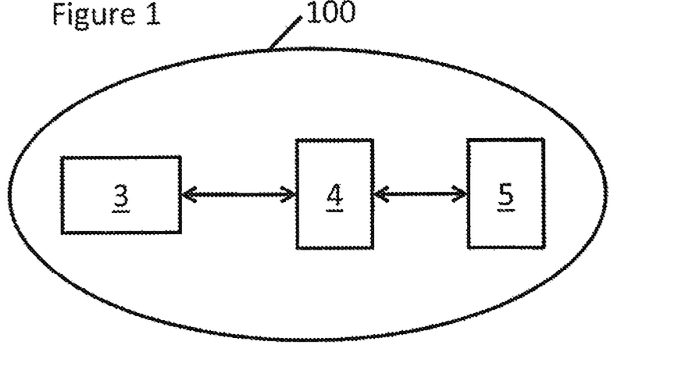
FIG. 1 shows a computer system for the implementing of an embodiment.

FIG. 1 shows a computer system 100 for the implementing of an embodiment. The computer system comprises a secure element 3 in electronic communication with a reader 4, itself in electronic communication with a verification entity 5. The verification entity 5 is a "second electronic device". The secure element 3 can be, for example, a chip card.

When the secure element 3 is connected to the reader 4 in order to carry out an electronic operation, the latter can take place online or offline. If it takes place online, this means that the reader 4 is in communication with the verification entity 5 when the secure element 3 is in communication with the reader 4. As such, authentication data can be sent directly to the verification entity 5. The verification entity 5 can directly verify the authentication data and if the verification is successful, the verification entity 5 can authorize the electronic operation. If the electronic operation takes place offline, the reader 4 itself applies determined verification criteria in order to decide if the electronic operation in progress is authorized. An online electronic operation is therefore more secure than an offline electronic operation.

The reader 4 can be, for example, a terminal of a public transport network, a payment terminal or a peripheral device that can be connected to a computer. The connection between the reader 4 and the secure element 3 can be with contact or contactless.

Figure 2:
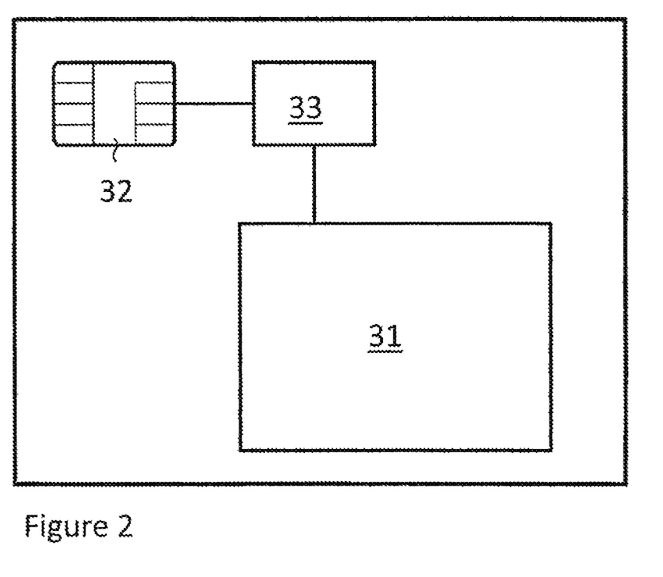
FIG. 2 diagrammatically shows the hardware architecture of a secure element in accordance with an embodiment.

FIG. 2 diagrammatically shows the hardware architecture of a secure element 3 in accordance with an embodiment. The secure element 3 is, in this example, an EMV chip card compliant with standard ISO 7816.

More particularly, the secure element 3 here comprises a microprocessor 33 coupled to external contacts 32 (entry/exit doors) and to means of recording 31.

It is considered here that the means for recording 31 is secure by calling upon a conventional security mechanism well known to those skilled in the art and which therefore will not be described here.

The external contacts 32 here form an interface module that allows the secure element 3 (and more particularly the microprocessor 33) to establish a communication, by contact in this example, with an external entity such as reader 4. It is understood, however, that other types of interface modules can be considered such as an interface module that makes it possible to establish a contactless communication (comprising a radio antenna for example) between the secure element 3 and the reader 4.

Figure 3:
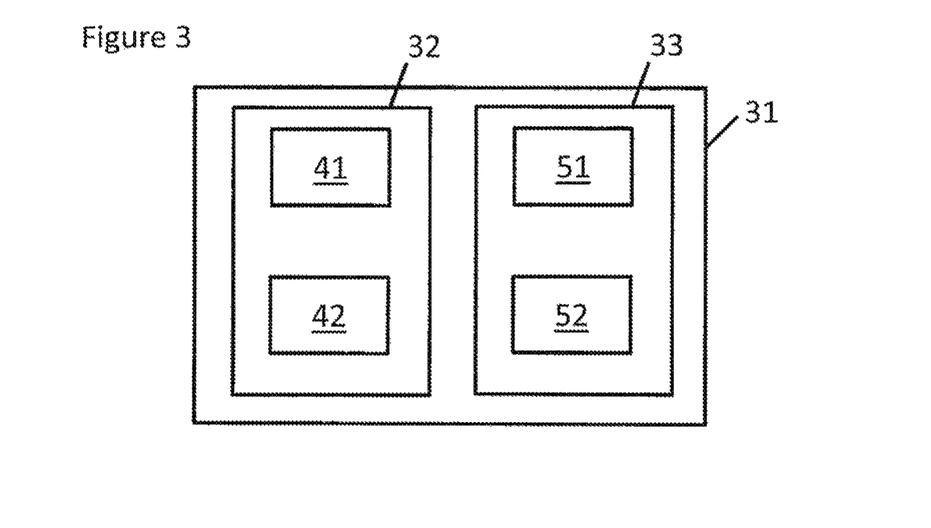
FIG. 3 diagrammatically shows means of recording used in an embodiment.

FIG. 3 diagrammatically shows means of recording 31 used in an embodiment. As shown in FIG. 3, the means of recording 31 store instructions 41 for a first application 1 and instructions 42 for a second application 2, preferably in a first non-volatile memory 32, which can be for example of the flash or ROM type. The means of recording 31 store data 51 for the first application 1 and data 52 for the second application 2, preferably in a second memory 33, which can be for example of the EEPROM or flash type.

In other terms, the means for recording 31 include a first memory space which corresponds to the first application 1 and comprising the instructions 41 for the first application 1 and the data 51 for the first application 1; and the means for recording 31 include a second memory space which corresponds to the second application 2 and comprising the instructions 42 for the second application 2 and the data 52 for the second application 2. The first memory space can be "dedicated" to the first application 1. The second memory space can be "dedicated" to the second application 1.

During the carrying out of the method according to the embodiments of this disclosure, the means for recording 31 are furthermore lead to store a first piece of data 11 (not shown here). In some embodiments, the first piece of data 11 is stored in the second memory 33. In other embodiments, the first piece of data 11 is stored in the portion of the first memory space that comprises the data 51 for the first application 1. In some embodiment, it is stored in a memory that can be rewritten hundreds of times, for example, an EEPROM.

Figure 4:
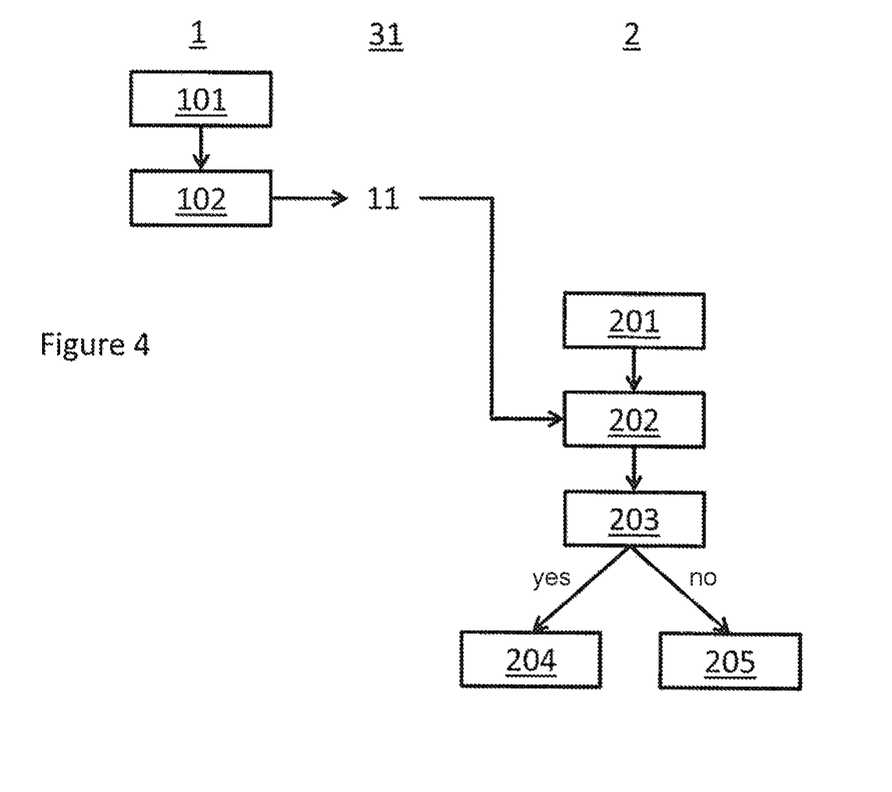
FIG. 4 diagrammatically shows a method for assisting in improving the security of an electronic operation according to an embodiment.

FIG. 4 diagrammatically shows a method for assisting in improving the security of an electronic operation according to an embodiment. The method is implemented using the first application 1 and the second application 2. In some embodiments, the method unfolds in the following way. The first application 1 is selected at 101. It writes at 102 a first piece of data 11 in the means for recording 31. It can also carry out various steps which are not required for the method according to the embodiments of this disclosure. For example, it can generate a first piece of authentication data from a first key stored in the means for recording.

The second application 2 is selected at 201. The second application 2 is, for example, the application for implementing the electronic operation of which it is desired to improve the security. The second application 2 reads at 202 the first piece of data 11 in the means for recording 31. It verifies at 203 that the first piece of data 11 satisfies a predefined condition. If yes, it carries out at 204 the electronic operation as planned. This includes in particular that the second application 2 generates authentication data based on a key stored in the means for recording 31. In some embodiments, if the first piece of data 11 does not satisfy the predefined condition, the second application takes at 205 a countermeasure which improves the security of the electronic operation.

In some embodiments, the authentication data is a security cryptogram, for example a payment cryptogram.

In an embodiment, the second application 2 carries out a conversion of the first piece of data 11 between the reading at 202 and the verification at 203.

In an embodiment, the predefined condition is a time condition. It can for example be that the time interval between the first selecting 101 of the first application 1 and the selecting 201 of the second application 2 is longer than a predetermined duration, for example one hour.

When the first selecting at 101 of the first application 1 takes place during an entry into an entity, the time condition can be that the first selecting at 101 of the first application 1 was followed over time by a second selecting of the first application 1, with this second selecting taking place during an exit from the entity.

In an embodiment, when the first piece of data 11 does not satisfy the predefined condition, the countermeasure taken at 205 by the second application 2 includes that the second application 2 blocks the electronic operation.

In an embodiment, when the first piece of data 11 does not satisfy the predefined condition, the countermeasure taken at 205 by the second application 2 includes that the second application 2 determines a piece of security information and sends it to the verification entity 5 via, for example, the reader 4. The security information makes it possible to alert the verification entity 5 which then can possibly block the electronic operation.

In an embodiment, if the selecting at 201 of the second application takes place using a contactless communication technology with the reader 4, the countermeasure at 205 can be to force the electronic operation to take place with contact with the reader 4.

In an embodiment, during the step of reading at 202, the second application 2 will look up the first piece of data 11 in the means for recording 31, for example in the first memory space. This can be done, for example, via a communication method of the "pull" type from the second application 2 to the first application 1.

In an embodiment, following the step of writing at 102, the first application 1 notifies the second application 2 that there is a modification of the first piece of data 11. This can be done for example via a communication method of the "push" type from the first application 1 to the second application 2. It is for example possible that the second application 2 registers with the first application 1 in order to indicate that it wishes to be notified of modifications of the first piece of data 11. This recording is done before the carrying out of the method according to the embodiments of this disclosure, for example when the user personalizes his secure element 2. It is also possible that the first application 1 comprises an instruction that indicates to it to notify the second application 2 of the modifications of the first piece of data 11.

In an embodiment, the first application 1 has a first memory space that is dedicated to it in the means for recording 31, that stores for example its instructions 41 and its data 51; and the second application 2 has a second memory space that is dedicated to it in the means for recording 31, that stores for example its instructions 42 and its data 52. An example of such an embodiment is shown in FIG. 3. In some embodiments, when the first application 1 writes at 102 the first piece of data 11 in the means for recording 31, it writes it in the first memory space. When the second application 2 reads at 202 the first piece of data 11 in the means for recording 31, it reads it in the first memory space. This can be done, for example, via a communication method of the "pull" type from the second application 2 to the first application 1.

In an embodiment, the application architecture on the secure element 3 is of the "ISO 7816 file system" type. A master file then comprises a directory file for the data 51 of the first application 1 and a directory file for the data 52 of the second application. Each one of the directory files comprises a plurality of elementary files. In some embodiments, during the reading at 202 of the first piece of data 11, the second application 2 queries the directory file for the data 51 of the first application 1, for example based on the assumed position of the first piece of data 11. This position can be. for example, specified by at least one of: an identifier of the directory file containing the first piece of data 11, an identifier of the elementary file containing the first piece of data 11, an offset that indicates the number of bytes from the beginning of the file, a length that indicates the number of bytes of the first piece of data 11. The reading 202 of the first piece of data 11 can be done by APIs known to those skilled in the art, for example via a select or read record command.

In an embodiment, the application architecture on the secure element 3 is of the "JAVA platform" type. The first application 1 is a first applet and the second application 2 is a second applet. Each applet has a dedicated memory space. For example, a first memory space dedicated to the first application 1 comprises a first plurality of elementary files and a second memory space dedicated to the second application 2 comprises a second plurality of elementary files. In some embodiments, the writing at 102 of the first piece of data 11 by the first application 1 and/or the reading at 202 of the first piece of data 11 by the second application 2 is carried out by a shareable interface mechanism. According to a first approach, the first application 1 has a role of a server and proposes access via a shareable interface to the first memory space to the second application 2 which has a role of a client. According to a second approach, the first application 1 has a role of a data server and proposes access via a shareable interface to the first memory space to the second application 2 which has a role of a client. In order to read at 202 the first piece of data 11, the second application 2 sends a request to this data server. According to a third approach, the first application 1 has a role of an event server and notifies the second application 2 of any modification in the first piece of data 11.

A first example of an application of an embodiment is as follows. The user of the secure element 3 enters a bus network and uses his secure element 3 to clock-in in the network. This clocking-in generates a selecting at 101 of the first application 1. The first application 1 writes at 102 the time of its first selecting in the first memory space. This time, which is the moment of the clocking-in, is the first piece of data 11. Within the hour that follows the clocking-in, while the user is in the bus, a fraudster approaches him and attempts to carry out a contactless electronic payment operation with the secure element 3. This generates the selecting at 201 of the second application 2. The second application 2 reads at 202 the first piece of data 11 in the first memory space and verifies at 203 the predefined condition. The second application 2 then sees that the time difference between the selecting at 201 of the second application 2 and the first selecting at 101 of the first application 1 is shorter than one hour: the predefined condition is not satisfied. The second application 2 then takes at 205 a countermeasure by requiring that the electronic payment operation is carried out by contact. It is then impossible for the fraudster to carry out the payment without the knowledge of the user of the secure element 3.

A second example of an application of an embodiment is as follows. The user of the secure element 3 connects thanks to his secure element 3 to a session of an entity which is a government internet site. The connection is made via a reader 4 connected to a computer. This connection generates a first selecting at 101 of the first application 1 which is an identification application. The first application 1 writes at 102 "entry" in the first memory space as the value of the first piece of data 11. While the user is still on his session, a fraudster attempts to carry out an electronic payment operation with the secure element 3. This generates the selecting at 201 of the second application 2. The second application 2 reads at 202 the first piece of data 11 in the first memory space at 202 and verifies at 203 the predefined condition. The predefined condition is that the first selecting at 101 of the first application 1 was followed over time by a second selecting of the first application 1, with this second selecting being linked to an exit from the entity, i.e., to a log out from the session. This predefined condition is not satisfied because the first piece of data is equal to "entry". The second application 2 then takes at 205 a countermeasure by prohibiting all electronic payment operations as long as the session is open. It is then impossible for the fraudster to carry out the payment without the knowledge of the user of the secure element 3 while the session is open. If the user logs out from his session on the entity, this generates a second selecting of the first application 1 which then writes "exit" in the first memory space as the value of the first piece of data 11. The user can then use the second application normally.

A third example of an application of an embodiment is as follows. The user of the secure element 3 logs on thanks to his secure element 3 to a session of an entity which is a computer portal of his professional environment. The log in is done via a reader 4 connected to a computer. This connection generates a first selecting at 101 of the first application 1 which is an identification application. The first application 1 writes at 102 the time of its first selecting in the first memory space as the value of the first piece of data 11. It is unlikely that the same secure element is used immediately following the first selecting at 101 of the first application 1 for a legitimate payment. Within ten minutes following the first selecting at 101 of the first application 1, a fraudster attempts to carry out an electronic payment operation with the secure element 3. This generates the selecting at 201 of the second application 2. The second application 2 reads at 202 the first piece of data 11 in the first memory space and verifies at 203 the predefined condition. The second application 2 then sees that the time difference between the selecting at 201 of the second application 2 and the first selecting at 101 of the first application 1 is shorter than fifteen minutes: the predefined condition is not satisfied. The second application 2 then takes at 205 a countermeasure by prohibiting the electronic operation. It is then impossible for the fraudster to carry out the payment.

In other words, the embodiments of this disclosure relate to a method for assisting in improving the security of an electronic operation carried out via a secure element 3. The method comprises, for example, the following steps. A first application 1 of the secure element 3 is selected at 101 and writes at 102 a piece of contextual data 11 in means of recording 31 of the secure element 3. Then, a second application 2 is selected at 201, reads at 203 the contextual data 11 in the means for recording 31 and verifies at 203 if the contextual data 11 satisfies a predefined condition. If yes, it is considered that the context of the selecting at 201 of the second application 2 is legitimate and the electronic operation can continue normally.

This disclosure was described in relation with specific embodiments, which are purely for the purposes of illustration and must not be considered as limiting. Generally, this disclosure is not limited to the examples shown and/or described hereinabove. Usage of the verbs "comprise", "include" or any other variant, as well as the conjugations thereof, cannot in any way exclude the presence of elements other than those mentioned. Usage of the indefinite article "a", "an", or of the definite article "the", in order to introduce an element does not exclude the presence of a plurality of these elements. The reference numbers in the claims do not limit their scope.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for assisting in improving the security of an electronic operation, said method being implemented by a secure element comprising means for storing instructions for execution of a first application and of a second application that is different from the first application, said method comprising the following successive steps:
   selecting the first application;
   writing, by the first application, a first piece of data in said means for storing;
   selecting the second application;
   reading, by the second application, said first piece of data in said means for storing;
   verifying, by the second application, that said first piece of data satisfies a predefined condition; and
   carrying out, by the second application, said electronic operation which comprises the generating of authentication data from a key stored in said means for storing;
   wherein said predefined condition is a time condition.

2. The method according to claim 1, wherein said predefined condition is that the time interval between the first selecting of the first application and the selecting of the second application is longer than a predetermined duration.

3. The method according to claim 1, wherein the first selecting of the first application is linked to an electronic operation corresponding to an entry into an entity, and said predefined condition is that said first selecting of the first application was followed over time by a second selecting of the first application which is linked to an electronic operation corresponding to an exit from said entity.

4. The method according to claim 1, wherein the second application determines a piece of security information and sends said piece of security information to a second electronic device.

5. The method according to claim 1, wherein selecting the second application is carried out by a contactless communication technology.

6. The method according to claim 5, wherein the second application forces said electronic operation to be carried out via a communication technology with contact.

7. The method according to claim 5, wherein the contactless communication technology includes a near field communication technology.

8. The method according to claim 1, wherein a first memory space of said means for storing corresponds to the first application, a second memory space of said means for storing, different from the first memory space, corresponds to the second application, and when the second application reads said first piece of data during said reading, the second application reads said first piece of data in the first memory space.

9. The method according to claim 8, wherein the first memory space is a directory file of the first application and the second memory space is a directory file of the second application.

10. The method according to claim 8, wherein the first application is a first applet, the second application is a second applet, the first memory space is dedicated to the first applet and the second memory space is dedicated to the second applet.

11. The method according to claim 1, wherein the first application is an application for access to a public transport network.

12. The method according to claim 11, wherein said writing is triggered by a clocking-in in said public transport network.

13. The method according to claim 12, wherein said clocking-in results in an opening of an entry gate.

14. The method according to claim 1, wherein the first application is an identification application.

15. The method according to claim 1, wherein the second application is an electronic payment application.

16. The method according to claim 15, wherein the generating of authentication data comprises a determination of a payment cryptogram.

17. The method according to claim 1, wherein the secure element is included in a chip card or a mobile telephone.

* * * * *